(12) United States Patent
Norton et al.

(10) Patent No.: US 7,875,087 B2
(45) Date of Patent: Jan. 25, 2011

(54) CAPACITORS INCLUDING INTERACTING SEPARATORS AND SURFACTANTS

(75) Inventors: John D. Norton, New Brighton, MN (US); Anthony W. Rorvick, Champlin, MN (US); Christian S. Nielsen, River Falls, WI (US)

(73) Assignee: Medtronic, Inc., Minneapolis, MN (US)

( * ) Notice: Subject to any disclaimer, the term of this patent is extended or adjusted under 35 U.S.C. 154(b) by 1416 days.

(21) Appl. No.: 11/247,013

(22) Filed: Oct. 11, 2005

(65) Prior Publication Data

US 2006/0028786 A1   Feb. 9, 2006

Related U.S. Application Data

(62) Division of application No. 10/622,957, filed on Jul. 18, 2003, now Pat. No. 6,995,971.

(60) Provisional application No. 60/474,800, filed on May 30, 2003.

(51) Int. Cl.
    H01G 9/00  (2006.01)
(52) U.S. Cl. ..................... 29/25.03
(58) Field of Classification Search ............ 29/25.03
    See application file for complete search history.

(56) References Cited

U.S. PATENT DOCUMENTS

| | | | |
|---|---|---|---|
| 3,303,805 A | 2/1967 | Steiner | |
| 3,493,751 A | 2/1970 | Davies | |
| 3,555,369 A | 1/1971 | Yoshino | |
| 3,612,871 A | 10/1971 | Crawford et al. | |
| 3,661,645 A | 5/1972 | Strier et al. | |
| 3,662,178 A | 5/1972 | Caputi et al. | |
| 3,673,017 A | 6/1972 | Peterson | |
| 3,677,844 A | 7/1972 | Fleischer et al. | |
| 3,713,921 A | 1/1973 | Fleischer et al. | |
| 3,802,972 A | 4/1974 | Fleischer et al. | |
| 3,852,134 A | 12/1974 | Bean | |
| 3,883,784 A | 5/1975 | Peck et al. | |
| 4,480,290 A | 10/1984 | Constanti et al. | |
| 4,855,049 A | 8/1989 | Toulemonde et al. | |
| 4,956,219 A | 9/1990 | Legras et al. | |
| 5,131,388 A | 7/1992 | Pless et al. | |
| 5,139,624 A | 8/1992 | Searson et al. | |
| 5,415,959 A | 5/1995 | Pyszczek et al. | |
| 5,449,917 A | 9/1995 | Clements | |
| 5,914,150 A | 6/1999 | Porter et al. | |
| 6,006,133 A | 12/1999 | Lessar et al. | |
| 6,120,875 A | 9/2000 | Haumont et al. | |
| 6,130,005 A | 10/2000 | Crespi et al. | |
| 6,280,883 B1 * | 8/2001 | Lamanna et al. | 429/307 |
| 6,432,572 B1 * | 8/2002 | Yoshida et al. | 429/56 |
| 6,818,344 B2 * | 11/2004 | Daoud | 429/112 |
| 2002/0110732 A1 * | 8/2002 | Coustier et al. | 429/144 |

* cited by examiner

*Primary Examiner*—Alexander G Ghyka
*Assistant Examiner*—Seahvosh J Nikmanesh

(57) ABSTRACT

The present invention relates generally to capacitor cells and the utilization of separator materials that interact with one or more surfactants in such cells. More specifically, the present invention is related to capacitor cells that include separators that are impregnated with a surfactant or that absorb and/or interact with a surfactant that is included in an electrolyte placed within the capacitor cell.

11 Claims, 7 Drawing Sheets

CAPACITORS INCLUDING INTERACTING SEPARATORS AND SURFACTANTS

CROSS REFERENCE TO RELATED APPLICATION

This application is a divisional of U.S. patent application Ser. No. 10/622,957, filed Jun. 18, 2003, now U.S. Pat. No. 6,995,971, which claims the benefit of prior provisional U.S. patent application Ser. No. 60/474,800, filed 30 May 2003, and entitled, "Capacitor Cells Including Enhanced Separator Systems and Materials" —the contents of which are fully incorporated herein.

FIELD OF THE INVENTION

The present invention relates generally to capacitor cells and the utilization of separator materials that interact with one or more surfactants in such cells. More specifically, the present invention is related to capacitor cells that include separators that are impregnated with a surfactant or that absorb and/or interact with a surfactant that is included in an electrolyte placed within the cell.

BACKGROUND OF THE INVENTION

A capacitor cell typically comprises an anode having a dielectric layer, a separator, a cathode, and an electrolyte solution. The anode and cathode often comprise stacked or coiled metallic foil members although pressed, sintered and formed powdered metal anodes are known and used in the art. The energy of a capacitor cell is stored in the electromagnetic field generated by opposing electrical charges separated by the dielectric layer disposed on the surface of the anode. Etching may be used to increase the surface area of the anode, as the energy stored by the cell is proportional to the surface area of the anode. A dielectric oxide layer is formed on the anode when a voltage is applied in an electrolytic solution. The dielectric layer insulates the anode from the cathodic electrolytic solution, allowing charge to accumulate. The separator holds the anode and cathode foils or powdered slug-type anodes apart to maintain charge and prevent short-circuiting. In one embodiment, the anode/separator/cathode laminate is typically rolled up to form a cylindrical coiled member and encased, with the aid of suitable insulation, in an aluminum tube that is subsequently sealed with rubber material. In such embodiments it is imperative that the cathode foil and anode foil be precisely positioned opposite each other on the separator material and be adequately separated by this same material.

An alternative design, commonly used in implantable cardioverter-defibrillators (ICDs), are flat (e.g., stacked electrode), compact aluminum electrolytic capacitors. These flat capacitors have been developed to overcome some disadvantages inherent in commercial cylindrical capacitors. For example, U.S. Pat. No. 5,131,388 to Pless et. al. discloses a relatively volumetrically efficient flat capacitor having a plurality of planar layers arranged in a stack. Each layer contains an anode layer, a cathode layer and means for separating the anode layers and cathode layers (such as paper). The anode layers and the cathode layers are generally comprised of foil plates of anode or cathode material and are usually electrically connected in parallel. In a paper "High Energy Density Capacitors for Implantable Defibrillators" presented at CARTS 96: 16th Capacitor and Resistor Technology Symposium, Mar. 11-15, 1996, several improvements in the design of flat aluminum electrolytic capacitors are described, such as the use of an embedded anode layer tab and solid adhesive electrolyte. Further advances in flat electrolytic capacitors are found in U.S. Pat. No. 6,006,133, issued to Lessar et al., which is incorporated by reference.

For flat, powdered metal, or cylindrical capacitor cells, it is necessary that the anode and cathode remain separated. A minimum separation between the anode and cathode must be maintained to prevent arcing between the anode and cathode, and to allow charge to accumulate without short-circuiting. In cylindrical cells, the anode and cathode foils are aligned precisely with a separator positioned between them and coiled tightly to prevent movement of the anode, cathode and separator during subsequent processing and use. Spacing is typically maintained at the electrode edges as well by providing separator overhang at the top and bottom of the anode and cathode winding, to prevent short-circuiting to the casing. In flat capacitor cells, anode to cathode alignment is typically maintained through the use of internal alignment posts or screws (as described, for example, in U.S. Pat. No. 6,006,133 to Lessar et al.). Alignment of the anode and cathode plates in flat capacitor cells again can be somewhat problematic in that the plates are generally small and difficult to maneuver and maintain in position during assembly of the capacitor cell.

Maintaining a proper distance between cell components is thus one of the prime functions of a separator. A separator must be resistant to degradation, have sufficient thickness to maintain inter-electrode separation without interfering with cell high performance, and exhibit sufficient surface energy such that electrolyte wettability and absorption are augmented. The enhancement of the weftability and absorption properties is desired since such enhancement is likely to reduce the equivalent series resistance of the cell thereby increasing the fraction of the stored energy delivered to the medical device. However, the separator must also have an electrical resistivity sufficiently high to prohibit short circuit current from flowing directly between the electrodes through the separator and tortuosity to provide adequate ionic transfer. These requirements are balanced by the need for the separator to have porosity sufficient to maintain electrode separation while allowing ionic transfer to occur unimpeded within the electrolyte during discharge. Additionally, the separator must have sufficiently strong tensile properties to facilitate cell fabrication and to withstand internal cell stresses due to changes in electrode volume during charge/discharge cycles.

Separators are generally made from a roll or sheet of separator material, and a variety of separator materials have been found to be effective. Paper, particularly Kraft paper, is a cellulose-based separator material that is commonly used. Cellulose separator materials are manufactured with high chemical purity. The total thickness of cellulose separators employed between anode and cathode plates will vary with the voltage rating of the capacitor structure and the type of electrolyte employed but, on the average, the thickness varies from 0.003" to 0.008" in connection with capacitors rated at from 6 volts to 600 volts.

A common alternative to paper separators are polymeric separators. Generally, polymeric separators are either made of microporous films or polymeric fabric. An example of a microporous film separator is a separator comprising polytetrafluoroethylene, disclosed in U.S. Pat. No. 3,661,645 to Strier et al. U.S. Pat. No. 5,415,959 to Pyszeczek et al., on the other hand, describes the use of woven synthetic halogenated polymers as capacitor separators. The use of "hybrid" separators comprising polymer and paper material has also been described. See, for example, U.S. Pat. No. 4,480,290 to Constanti et al., which describes the use of separators including a porous polymer film made from polypropylene or polyester and absorbent paper.

In the assembly of a capacitor cell it is important to maintain orientation, contact and, as applicable, alignment of the anode, cathode, and separator components. Failure to align these components may lead to short-circuiting or inefficient capacitor performance. For example, in cylindrical capacitors, proper spacing is typically maintained at the electrode edges or peripheries by providing separator overhang at the top and bottom of the anode and cathode winding, which results in a larger capacitor than would otherwise be necessary. In addition, the anode and cathode are precisely aligned and coiled tightly by a winding machine to prevent movement of the anode, cathode, and separator during subsequent processing and use. Alternatively, in flat capacitors, anode to cathode alignment is typically maintained through the use of internal alignment posts. Build-up of static charge in the separator material during manufacture of such capacitors can make handling of the material particularly troublesome. All of these techniques have the disadvantage or requiring extra machinery or capacitor components that would not otherwise be required.

It would be desirable to employ in capacitor cells, such as batteries or capacitors, a separator material that is sufficiently thin, has strong tensile properties, possesses enhanced wettability and absorption characteristics, is resistant to degradation in the cell environment, and has a precise porosity sufficient for use with a particular capacitor cell.

BRIEF DESCRIPTION OF THE DRAWINGS

The above and other objects and aspects of the invention will be apparent from the description of embodiments illustrated by the following accompanying drawings.

SUMMARY OF THE INVENTION

Figure 1:
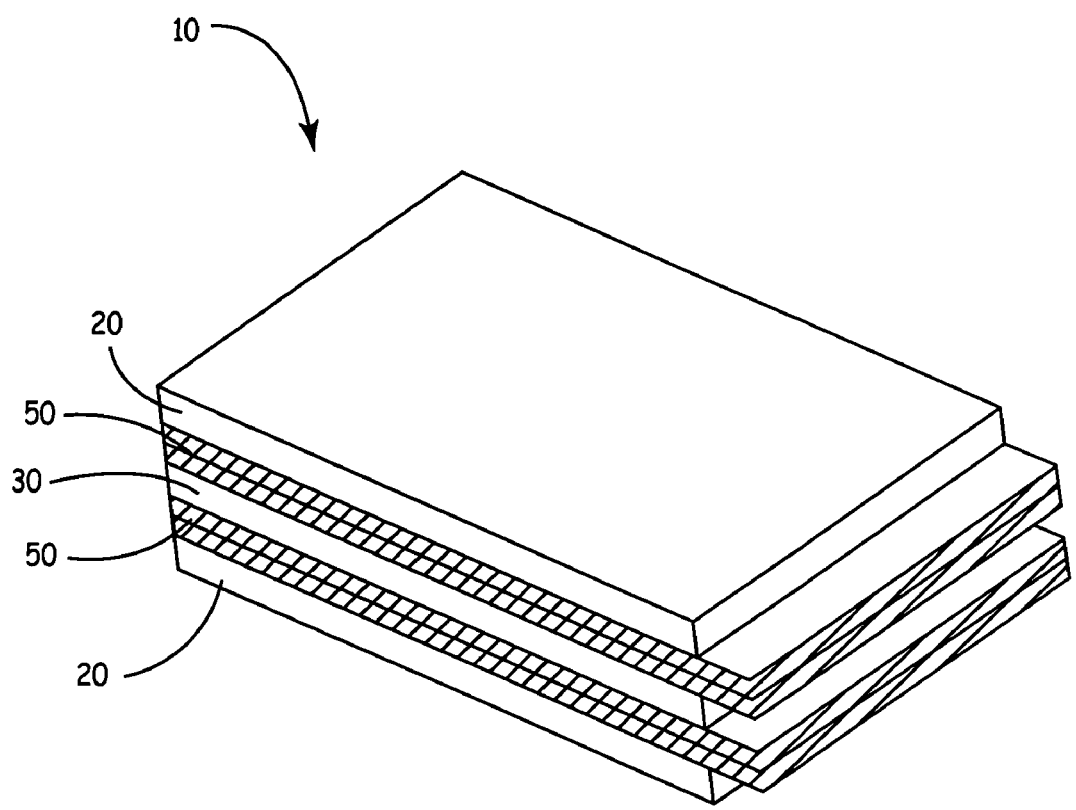
FIG. 1 depicts a top perspective view of a portion of an anode/separator/cathode laminate.

The present invention relates to capacitor cells and the utilization of separator materials that interact with one or more surfactants in such cells. In various embodiments, the capacitor cell of the present invention comprises one or more anodes, one or more cathodes operatively associated with the anodes, an electrolyte operatively associated with the anodes and the cathodes, one or more separators provided in between the anodes and the cathodes to prevent internal electrical short circuit conditions and to allow sufficient movement of the electrolyte within the capacitor cell and one or more surfactants for enhancing the wettability and absorption of the separators.

Generally, the separators utilized in the present invention include one or more separator materials, such as nonwoven polymers, microporous polymers, track etched materials and papers. For example, the separators may include polyesters, polyethylene, polypropylene, polycarbonate, polytetrafluoroethylene, Kraft paper, Manila paper, NUCLEPORE®, CYCLOPORE™, ISOPORE™, PORETICS® and MEMTREX™, and SPI-Pore™ or combinations thereof.

Additionally, capacitor cells according to the present invention further include one or more surfactants for stimulating and enhancing the wettability and/or absorption of the separator material. In some embodiments of the present invention, the separators are impregnated with the one or more surfactants. It is noted that the impregnated separators may also be optionally crosslinked with a crosslinking reagent to thereby retain the surfactant within the separator material. Alternatively, the one or more surfactants may be mixed with the electrolyte and interact with the separators upon administering the electrolyte to the other components of the capacitor cell. Examples of surfactants utilized in the present invention include, but are not limited to polyvinyl alcohol, dextran, agarose, alginate, polyacrylamide, polyglycidol, polyvinyl alcohol-co-polyethylene, poly(vinyl acetate-co-vinyl alcohol), polyacrylic acid, polyamide, polypeptides, poly-lysine, polyethyleneimine, poly-.beta.-malic acid, hyaluronic acid, derivatives of hyaluronic acid, polysaccharides, polyvinylpyrrolidone, and combinations or copolymers thereof.

The present invention also provides methods of making a capacitor cell that includes separators that interact with surfactants. In one embodiment of the present invention the capacitor cell may be produced by first providing one or more separators, one or more anodes and one or more cathode. It is noted that the separators may be administered with one or more surfactants to enhance the wettability and absorption of the separators. As previously suggested the separators may be impregnated with the surfactants or exposed to the surfactants when contacted with an electrolyte. Once the separators, anodes (fully anodized in the case of powdered metal anodes) and cathodes are present, the separators are positioned between the anodes and cathodes so that the anodes and cathodes are unable to come in physical contact with each other. For flat electrolytic and cylindrical type capacitors the alternating anodes and cathodes that are separated by separator material, are inserted into a cell enclosure. An electrolyte is then placed into the cell enclosure to activate the anodes and cathodes. Finally, the enclosure is sealed to retain and maintain the separators, anodes, cathodes surfactants and electrolyte within the enclosure.

The foregoing and additional advantages and characterizing features of the present invention will become increasingly apparent to those of ordinary skill in the art by references to the following detailed description and to the drawings.

DETAILED DESCRIPTION OF THE INVENTION

The present invention comprises a capacitor cell generally including one or more cathodes, one or more anodes, one or more separators disposed between each anode and cathode pair, an electrolyte and one or more surfactants, which enhance the wettability and absorption of the separator. More specifically, the capacitor cell of the present invention includes a separator that is impregnated with a surfactant or that absorbs and/or interacts with a surfactant to provide enhanced wettability and/or electrolyte absorption.

The separator utilized in the present invention may be produced from any suitable separator material including but not limited to 1) nonwoven polymers, such as polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate; 2) microporous polymers such as polytetrafluoroethylene (PTFE); 3) track etch materials (track etched materials are explained further in the following paragraphs); and papers, such as Kraft paper (cellulose) or Manila paper.

A number of embodiments of the present invention utilize track-etched separators. The process of making track etched materials is well known in the art and many variations of the process exist. Examples of processes for forming track etched membranes are disclosed in U.S. Pat. Nos. 3,303,805; 3,493,751; 3,612,871; 6,120,875; 3,662,178; 3,673,017; 3,677,844; 3,713,921; 3,802,972; 3,852,134; 4,855,049; 4,956,219; 5,139,624; 5,449,917; 5,914,150, the entire contents of each of which are incorporated herein by reference. The present separator can be comprised of any material that has been track etched according to any of the processes disclosed in the references above or according to any known track etching process.

While the material that is track etched can be any known material that is capable of being track etched, in preferred embodiments, the separator material comprises a polymeric material. Polymeric materials include but are not limited to polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate.

In particularly preferred embodiments, the track-etched material comprises a polycarbonate material. Polycarbonate materials are preferred because they have outstanding impact resistance and toughness. They also have high tensile and structural strength. Commercial polycarbonate materials are produced in various countries and are sold under the trade names LEXAN, MERLON, MAKRAYLON, JUPILON, and PANLITE. Additionally, commercially available track-etched membranes include but are not limited to NUCLEPORE® and CYCLOPORE™ distributed by WhatMan, Inc. located in Newton, Mass., ISOPORE™ distributed by Millipore, Inc. located in Billerica, Mass., PORETICS® and MEMTREX™ distributed by Osmonics located in Minnetonka, Minn., and SPI-Pore™ distributed by Structure Probe, Inc. located in West Chester, Pa.

In one preferred embodiment, the separator is a pure cellulose, very low halide or chloride content Kraft paper having a thickness of about 0.0005 inches, a density of about 1.06 grams/cm.sup.3, a dielectric strength of 1,400 ac Volts per 0.001 inches thickness, and a low number of conducting paths (about 0.4/ft$^2$ or less). When including either anode foil plates or cathode foil plates in conjunction with separators, the separators are preferably cut slightly larger than the foil plates to accommodate misalignment during the stacking of separators and foil plates and to prevent subsequent shorting between electrodes of opposite polarity.

It is preferred that separators be formed of a material that: (a) is chemically inert; (b) is chemically compatible with the selected electrolyte; (c) may be impregnated with the electrolyte to produce a low resistance path between adjoining anode and cathode layers, and (d) physically separates adjoining anode and cathode layers. Separators utilized in embodiments of the present invention may also be formed of materials other than Kraft paper, such as Manila paper, porous polymeric materials or fabric gauze materials. For example, porous polymeric materials may be disposed between anode and cathode layers, similar to those disclosed in U.S. Pat. Nos. 3,555,369 and 3,883,784, in some embodiments of the present invention.

Preferably, the separators utilized in embodiments of the present invention have a thickness suitable for use in a capacitor cell. The range of thicknesses of separators typically available for utilization in capacitor cells of the present invention is approximately 250 microns or less and preferably between 5-250 microns (or approximately 0.0002-0.01 inches), most preferably 10-50 microns.

The capacitor cells of the present invention further include a surfactant, which enhances the wettability of the separator and increases the separator's electrolyte absorption characteristics. Generally, the surfactants utilized in the cells of the present invention are either imbedded in the material during their construction or applied after construction of the separator web. The surfactants generally function in the cell to reduce the surface energy (wetting angle) of the separator material thereby allowing for better solvent or electrolyte wetting (e.g. water). For example, in various embodiments of the present invention the surfactant makes the material more hydrophilic thereby lowering the contact angle between the electrolyte and the surface of the material. This hydrophilic activity stimulates the wetting of the surfactant, which translates to better transmission of ions between the cathode and anode.

Any surfactant which enhances the wettability characteristics of the separator material may be utilized in the present invention. For example, polyvinyl alcohol, dextran, agarose, alginate, polyacrylamide, polyglycidol, polyvinyl alcohol-co-polyethylene, poly(vinyl acetate-co-vinyl alcohol), polyacrylic acid, polyamide, polypeptides, poly-lysine, polyethyleneimine, poly-.beta.-malic acid, hyaluronic acid, derivatives of hyaluronic acid, polysaccharides and polyvinylpyrrolidone, alone or in combination may be utilized as suitable surfactants with the capacitor cells of the present invention.

Additionally, as previously suggested the separators utilized in embodiments of the present invention may be impregnated with one or more surfactants or may interact and absorb a surfactant that has been added to the electrolyte. In one embodiment of the present invention separator material, such as polymeric material, may be impregnated with one or more surfactants during assembly of the separator material. For example, polymeric separators that are impregnated with one or more surfactants may be assembled by supplying the one or more surfactants to a mixture of the corresponding monomers of the desired polymeric separator. Once the surfactants are added, the mixture can be polymerized, thereby capturing the surfactants within the separator material and hence impregnating the separator material with one or more surfactants. In various embodiments of the present invention, the polymer/surfactant mixture may be extruded, during or after the polymerization process, to form the desired sheet configuration common to separators.

In an alternative embodiment separators may be impregnated with the one or more surfactants by placing or dipping a layer of separator material in a solution containing one or more surfactants and allowing the separator material to adsorb the surfactants. For example, in a preferred embodiment, a solution comprised of a surfactant, such as polyvinylpyrrolidone, is dissolved in a suitable solvent at a concentration of about 0.001% to about 99.9%, preferably about 0.01% to about 50%, more preferably about 1.0% to about 25%, and most preferably about 0.25% to about 5% and initially adsorbed onto the surfaces and optionally into the porous spaces of a porous separator material simply by dipping the separator material in the solution for about 0.05 minutes to about 20 minutes to permit physisorption of the surfactant to the surfaces of the separator material. This impregnation process may be performed utilizing other suitable surfactants including, but are not limited to, polyvinyl alcohol, dextran, agarose, alginate, polyacrylamide, polyglycidol, polyvinyl alcohol-co-polyethylene, poly(aspartic acid), poly(ethyleneglycol-co-propyleneglycol), poly(vinyl acetate-co-vinyl alcohol), polyacrylic acid, poly-B-malic acid), polyamide, polylysine, polyethyleneimine, and polysaccharides, or their copolymers, either alone or in combination. Preferably, the surfactant contains hydrophilic functional side groups on each monomer for attracting electrolyte.

Suitable solvents for the hydrophilic surfactants include, but are not limited to, methanol, ethanol, isopropanol, tetrahydrofuran, trifluoroacetic acid, acetone, water, dimethyl formamide (DMF), dimethyl sulfoxide (DMSO), acetonitrile, benzene, hexane, chloroform, methylene chloride, supercritical carbon dioxide, or other compounds which solvate the first layer.

For porous separator materials, excess adsorbed surfactant may be rinsed from the surface of the separator material using fresh solvent to prevent bulk-deposited surfactant from partially blocking pores of the separator material. Though optional, this step is preferred in order to ensure that the pores of a porous separator material are not obstructed with surfactant.

Once the surfactants are absorbed by the separator material, the surfactants may optionally be cross-linked to themselves and/or the separator material using a suitable cross-linking agent to assist in maintaining the hydrophilic properties of the separator material. The crosslinking serves to greatly reduce or eliminate the potential for desorption or migration of the surfactant. Suitable reagents for forming cross-linkages between surfactants and/or separator materials are compounds comprised of at least two chemically functional groups, either homofunctional or heterofunctional, that include, but are not limited to, aldehydes, epoxides, acyl halides, alkyl halides, isocyanates, amines, anhydrides, acids, alcohols, haloacetals, aryl carbonates, thiols, esters, imides, vinyls, azides, nitros, peroxides, sulfones, and maleimides, dissolved in solvents that wet the adsorbed layer. In addition, vinyl sulfone, succinyl chloride, polyanhydrides, poly-B-malic acid, ethylene glycolbis-succinimidyl succinate, succinimidyl succinate-polyethylene glycol, and succinimidyl succinamide-polyethylene glycol can also be used as cross-linking agents. Solvents suitable for dissolving the cross-linking reagent include, but are not limited to, acetone, water, alcohols, tetrahydrofuran (THF), dimethyl sulfoxide (DMSO), dimethyl formamide (DMF), benzene, acetonitrile, and dioxane. Other cross-linking reagents include, but are not limited to, free radicals, anions, cations, plasma irradiation, electron irradiation, and photon irradiation.

In a further embodiment of the present invention the one or more surfactants may be added to the electrolyte wherein upon electrolyte contact with the separator the surfactants stimulate wettability and absorption properties of the separator material. For example, polyethylene glycol and polyvinylpyrrolidone may be mixed to form a suitable electrolyte-surfactant mixture that provides enhanced wettability of the separator and better ion transmission The separators and surfactants of the types described above can be used in any capacitor cell. In certain embodiments, the above described separators and surfactants are used in a battery. For example, the battery may be a lithium battery. In lithium batteries, the anode comprises lithium and the cathode comprises an active material such as, for example, carbon fluoride, a metal oxide, or a metal oxide bronze. More specifically, the battery may be a lithium silver vanadium oxide battery. In this type of battery, the anode is comprised of lithium and the cathode is comprised of silver vanadium oxide. An example of a lithium silver vanadium oxide battery is described in U.S. Pat. No. 6,130,005 to Crespi et al., the entire contents of which are herein incorporated by reference.

In other embodiments, the above described separators and surfactants are used in a capacitor. In one embodiment, the capacitor may be an electrolytic capacitor. More specifically, the capacitor may be an aluminum electrolytic capacitor. In an electrolytic capacitor, both the anodes and cathodes are typically made of aluminum, preferably aluminum foil. Generally, the anode foils are between about 0.008 to about 0.001 inches thick. For example, in certain embodiments, each anode foil comprises comparatively stiff, high purity aluminum foil about 0.004 inches thick. Likewise, the cathode foils are between about 0.005 to about 0.0005 inches thick. For example, in certain embodiments, each cathode foil comprises comparatively flexible, high purity aluminum foil about 0.001 inches thick.

In yet other embodiments of the present invention the capacitor cell comprises a valve metal anode fabricated by pressing powdered metal into a slug, sintering the slug, and then anodizing the slug. In this embodiment the separator material is interposed between a fully formed anode and an adjacent volume of cathodic material. The fully formed anode may be configured in diverse shapes and thus, the separator material should be adequately compliant as well as possess the other desirable properties described herein.

Figure 2:
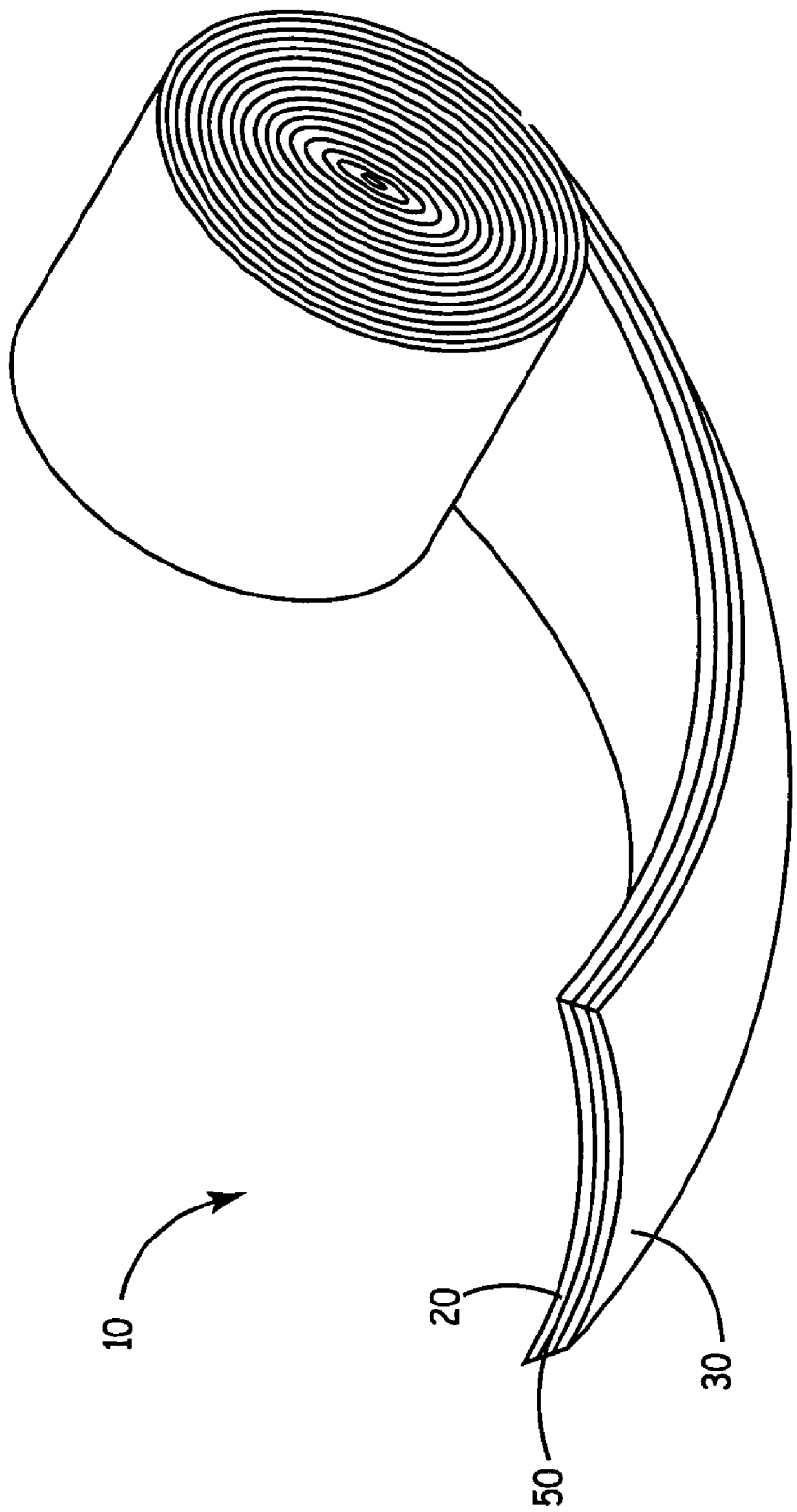
FIG. 2 depicts a perspective view of an anode/separator/cathode laminate partially formed into a circular, coiled position.
Figure 3:
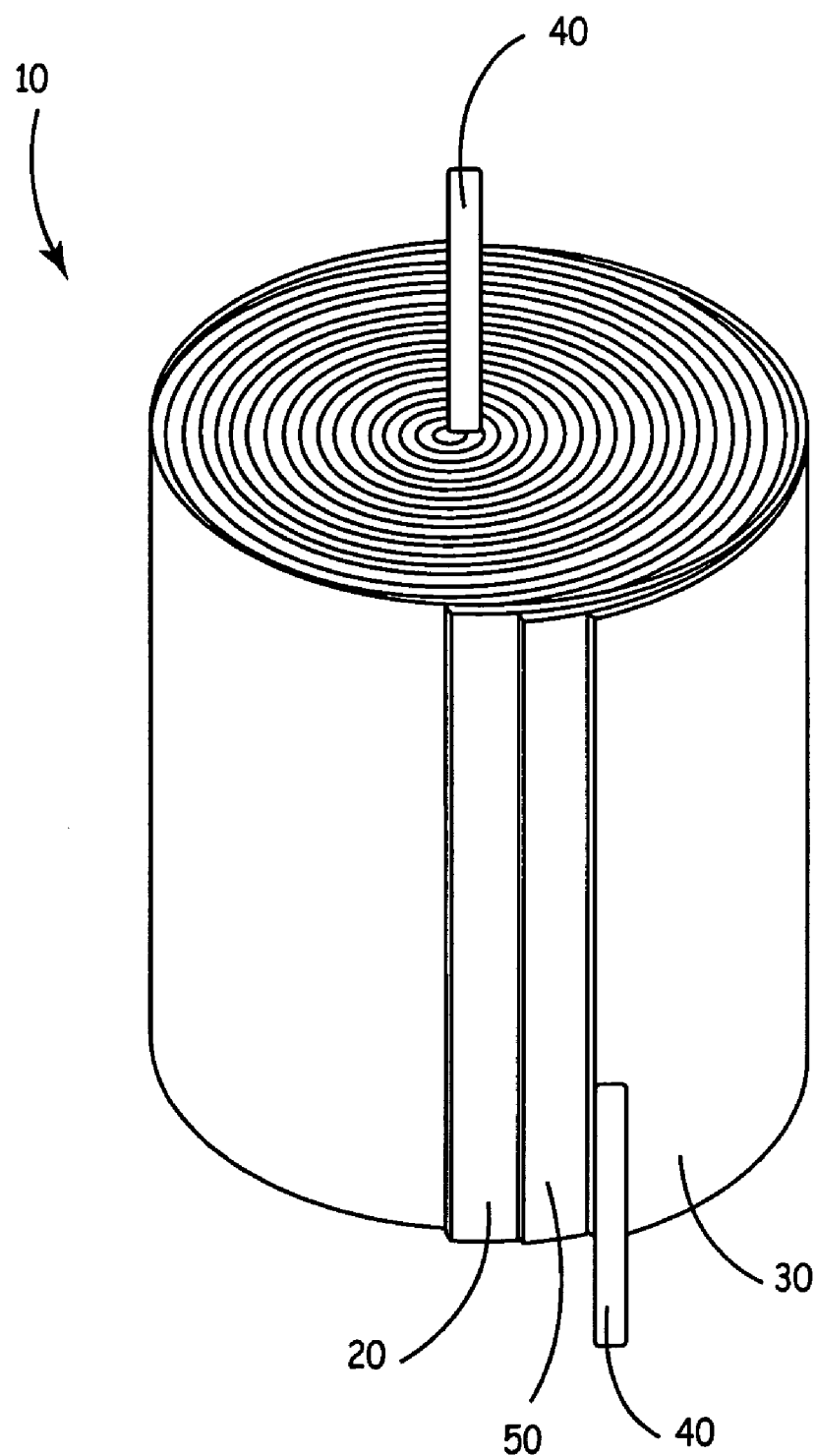
FIG. 3 depicts a perspective view of an anode/separator/cathode laminate completely formed into a circular, coiled position.

Other embodiments of the invention will now be described with reference to the drawings. The capacitor cell containing the above described separators and surfactants can be of any suitable configuration, for example a flat, cylindrical or, in the case of powdered valve metal capacitors, and arbitrary configuration. It is to be understood that although the drawings primarily depict flat or cylindrical capacitor cells, the present invention is also specifically directed to powdered valve metal capacitors. FIGS. 2-3 depict a capacitor cell formed in a cylindrical configuration. FIGS. 4-7 depict a capacitor cell formed in a flat construction. While the capacitor cell can have any configuration, a flat configuration is preferred because it is typically smaller in design than a cylindrical configuration and capable of operating within small medical devices, such as defibrillators or pace makers.

The anode and cathode layers can be comprised of any electrically conductive anode and cathode material known in the art to be used in capacitor cells. For example, typical anode materials include alkali metals or alkali earth metals selected from Groups IA, IIA and IIIB from the Periodic Table of Elements.

For example, these anode materials include but are not limited to lithium, aluminum, sodium, potassium, calcium, magnesium, vanadium, tantalum, niobium or similar alloys or combinations. Likewise, typical cathode materials include electrically conductive metals include ruthenium, vanadium, copper, silver, chromium, bismuth, lead, tantalum, carbon, aluminum, magnesium, titanium, niobium, zirconium, zinc or similar alloys or combinations. These type of cathode materials may be provided with a semiconductive or pseudocapacitive coating. The coating may be an oxide, nitride, carbide, or carbon nitride.

In various embodiments of the present invention, both the anodes and cathodes are made of a metal foil, preferably thin metal foil. Metal foil is particularly desirable because it is easily susceptible to etching and/or forming procedures. Such procedures are done to increase the surface area of the anode or cathode material. An increase in the surface area of either the anode or cathode often improves the performance of the capacitor cell. For example, if the capacitor cell is a capacitor, the anode foil is typically processed to create a high capacitance per unit area. Typically, the capacity of an electrolytic capacitor is determined by the area of the anode surfaces and the thickness of the dielectric film covering this surface. As a result, an increase in capacity can be obtained if the surface area of the anode layer is increased.

A number of methods have been developed for increasing the surface area of an anode or cathode material. Such methods include but are not limited to sand blasting, mechanical embossing, scratching with rotating brushes, use of abrasive materials, forming in rotary dies, and chemical etching. Each of these methods are well known in the art and any method can be used to increase the surface area of the anode or cathode. Preferably, a chemical etching procedure is used. Optimally, etching dissolves portions of the metal to create a dense network of billions of microscopic tunnels penetrating therethrough.

Figure 4:
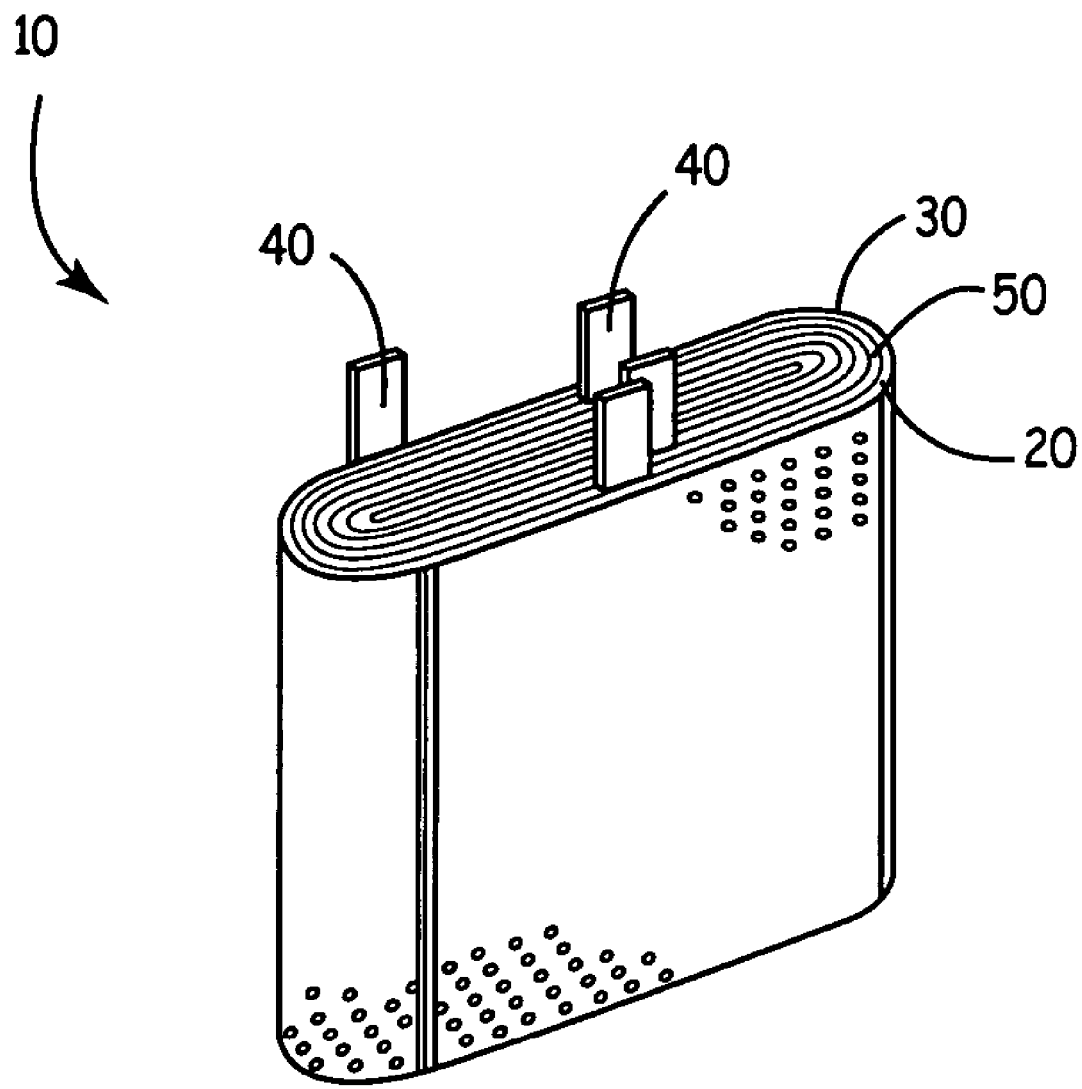
FIG. 4 depicts a perspective view of an anode/separator/cathode laminate formed into a flat, coiled position.
Figure 5:
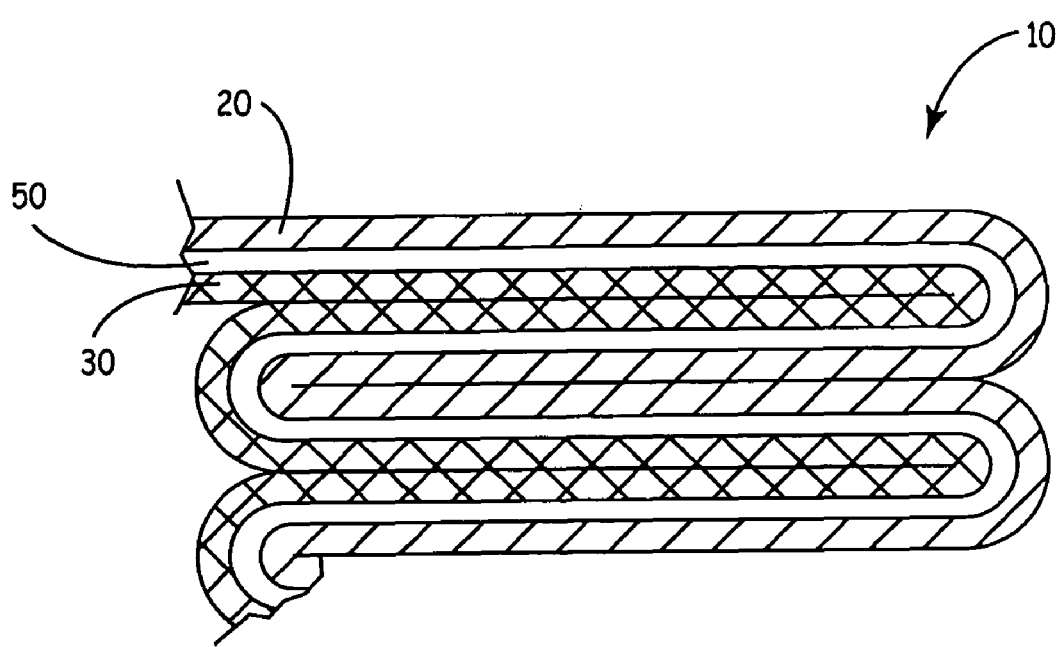
FIG. 5 depicts a side view of an anode/separator/cathode laminate formed into a flat, stacked position.
Figure 6:
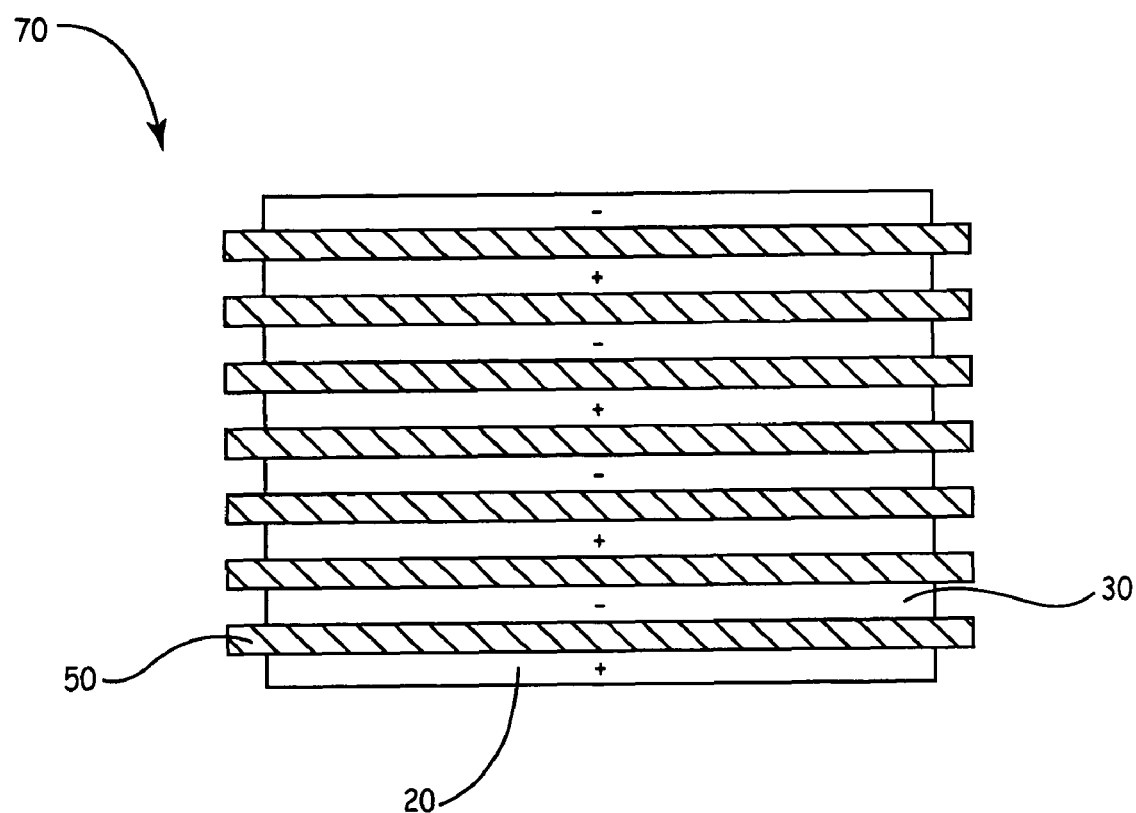
FIG. 6 depicts a side view of layers of separator material positioned between alternating anode and cathode layers.
Figure 7:
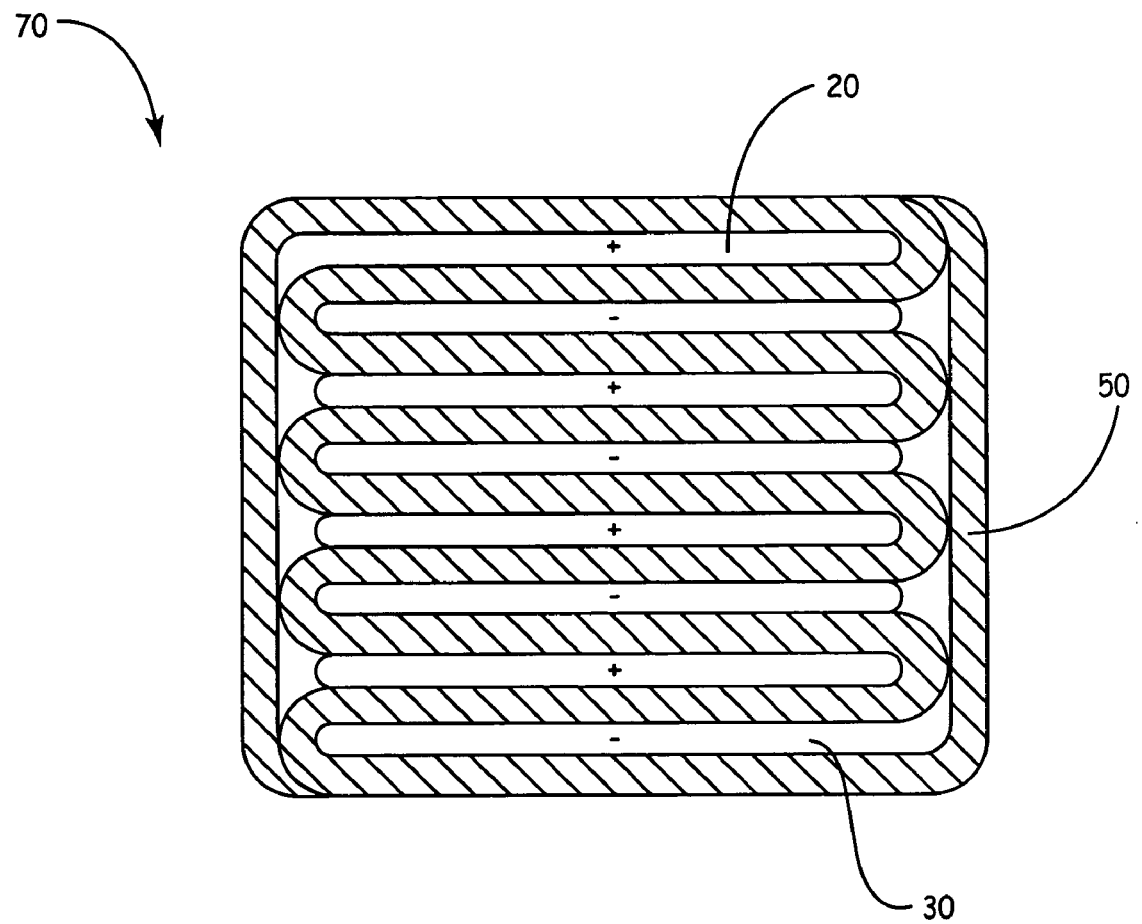
FIG. 7 depicts a side cross sectional view of a strip of separator material wrapped around alternating anode and cathode layers.

The anode, separator and cathode of the capacitor cell can be configured together in any suitable form. For example, in certain embodiments, the anode, separator, and cathode material can be configured together as strips laminated together. In other embodiments, the anode, separator, and cathode material can be configured as separate layers of material. FIGS. 1-5 depict the anode, separator and cathode material in a laminate form. FIGS. 6-7 depict the anode, separator and cathode material in a layer form.

FIG. 1 depicts a portion of an anode/separator/cathode laminate. Generally, the laminate 10 comprises anode material 20, separator material 50, such as an surfactant impregnated separator, and cathode material 30 adhered together. These materials can be adhered together using any suitable adhesive, for example by using an ion-conducting adhesive. The laminate can be made by adhering an anode strip and cathode strip to each side of the separator. FIG. 1 specifically shows a laminate having an anode/separator/cathode/separator/anode configuration. However, it should be apparent to one of skill in the art that any number of anode, separator and cathode materials or strips of material can be used to form a suitable laminate. In addition, those of skill in the art will readily recognize that the present invention is not limited to adhesive electrode laminates, but should be construed to apply to any capacitor cell wherein an anode and a cathode requiring mechanical separation are disposed in a common enclosure adjacent electrolyte. That is, the teaching of the present invention applies to battery cells in addition to the capacitor cells used to exemplify the present invention.

The laminate 10 can be coiled or wrapped within a capacitor cell in any suitable configuration. For example, FIG. 2 depicts a laminate 10 partially wrapped in a cylindrical coil position. FIG. 3 shows the laminate 10 completely wrapped in a cylindrical coil position. Also shown in FIG. 3 are electrical connections 40, each extending from an anode strip 20 and a cathode strip 30. While laminates are typically wrapped in a cylindrical coil position, this is not by any means necessary. For example, as shown in FIG. 4, the laminate 10 can be wrapped in a flat coil position. A flat coil position is particularly desirable as it reduces the space necessary for containing the capacitor cell. FIG. 4 also shows electrical connections 40 extending from anode strips 20 and cathode strips 30.

Likewise, while laminates are often coiled in position, other configurations are available. For example, FIG. 5 depicts a laminate 10 configured as a z-fold stacked configuration. Stacked configurations of the laminate 10 may be preferable over coiled configurations in order to optimize packaging efficiency.

FIGS. 6 and 7 depict the anodes and cathodes configured as separate layers or plates rather than a laminate sheet. In these embodiments, each anode layer 20 and cathode layer 30 is a substantially rectangularly-shaped segments. However, it should be apparent that the anode layers 20 and cathode layers 30 can be configured in any suitable shape. The shapes of these layers are primarily a matter of design choice, and are dictated largely by the shape, size, or configuration of the enclosure within which the layers are ultimately disposed. Also, each anode layer 20 and cathode layer 30 can be formed into a specific, predetermined shape using a die apparatus, such as that disclosed in commonly owned U.S. Pat. No. 6,006,133 to Lessar et al., the entire contents of which are herein incorporated by reference. The shapes of the layers are primarily a matter of design choice, and are dictated largely by the shape or configuration of the cell enclosure within which those layers are disposed.

Likewise, the separator material 10 associated with the anode layers 20 and cathode layers 30 can be configured in any arbitrary shape to optimize packaging efficiency. For example, in FIG. 6, the separator layer 50 is configured as substantially rectangularly-shaped segments that are disposed in between each anode and cathode layer. The separator layers 50 are typically longer than the anode layers 20 and cathode layers 30 to ensure that proper separation is maintained. Alternatively, in FIG. 7, the separator material is configured as one long strip of material that is wrapped around the electrode layers. It should be apparent that the long strip of separator material can be wrapped around the electrode layers in any suitable manner.

While in the embodiments depicted in the Figures, the anodes 20 and cathodes 30 of the capacitor cell are generally configured as single strip (or layer) of metal, in certain embodiments, one or more of the anode strips (or layers) may comprise a double strip or double layer with an electrically conductive strip (or layer) positioned in between. The electrically conductive strip (or layer) may be welded in between the two anode strips (or layers). Preferably, the electrically conductive strip (or layer) is made of aluminum metal.

It should also be understood by those skilled in the art that the length of the anode/separator/cathode laminate used or that the precise number of anode and cathode layers selected for use in a given capacitor cell will depend on the energy density, volume, voltage, current, energy output and other requirements of the device. Similarly, it will be understood by those skilled in the art that the precise number of notched and un-notched anode layers, anode tabs, anode sub-assemblies, and cathode layers selected for use in a given capacitor cell will depend upon the energy density, volume, voltage, current, energy output and other requirements placed upon the capacitor cell.

All of the capacitor cell components are typically sealed within an enclosure (not shown). The enclosure is preferably comprised of a corrosion-resistant metal such as stainless steel or titanium. The enclosure is usually filled with a liquid electrolyte. In various embodiments of the present invention, the capacitor cell may include any electrolyte solution suitable for use with a capacitor cell. For example, in embodiments where the capacitor cell comprises an electrolytic capacitor, the electrolyte contains either a glycerol or glycol, as these render the capacitors operative over a much increased temperature range. For example, in certain embodiments, the electrolyte solution contains ethylene glycol or tetraethylene glycol dimethyl ether ("tetraglyme").

In certain embodiments, the capacitor cell includes electrical connections 40 extending from one or more anodes and cathodes. These electrical connections 40 may pass through the enclosure to the outside of the cell. Where the electrical connections 40 pass through the enclosure, they can be sealed against fluid leakage by adhesive bonding, heat sealing, heat molding, etc.

The present invention also provides methods for making a capacitor cell. The method generally comprises providing a separator of the type described above, and positioning on the separator material one or more pairs of alternating cathode and anode plates or layers so that a separation is maintained between the anode and cathodes. Also, as previously disclosed the separator may be impregnated with one or more surfactants. In positioning the separator within the cell, it is important to maintain contact and alignment of all anode, cathode, and separator components. Failure in either aspect can lead to short-circuiting or inefficient capacitor performance. Finally, the anode/separator/cathode assembly is enclosed in a case with one or more suitable electrolytes.

Those of skill in the art will recognize that many of the embodiments and techniques provided by the present invention may be used, as applicable, to electrically isolate electrodes of diverse electrochemical cells, such as primary and secondary battery cells. That is, the teaching of the present invention is not to be strictly limited to capacitor cells but should be fairly construed to include other types of electrochemical cells as set forth in the appended claims.

While the invention has been described in conjunction with specific embodiments thereof, many alternatives, modifications, and variations apparent to those skilled in the art in light of the foregoing description. Accordingly, the preceding disclosure is intended to embrace all such alternatives, modifications, and variations, which fall within the spirit and broad scope of the invention.

The invention claimed is:

1. A method of making a capacitor cell comprising:
    providing one or more separators, one or more anodes and one or more cathodes, wherein the anode comprises at least one material selected from the group consisting of potassium, calcium, magnesium, vanadium, tantalum, and niobium;
    positioning the one or more separators in between the anodes and cathodes;
    administering one or more surfactants to the one or more separators to enhance the wettability and absorption of the one or more separators;
    inserting the positioned one or more separators, anodes, and cathodes into a cell enclosure;
    administering an electrolyte into the cell enclosure to activate the anodes and cathodes; and
    sealing the enclosure to retain and maintain the one or more separators, anodes, cathodes, surfactants, and electrolyte within the enclosure.

2. A method according to claim 1 wherein the surfactants are administered to the one or more separators by impregnating the separators with the surfactants before positioning them between the anodes and cathodes.

3. A method according to claim 2 wherein the one or more separators impregnated with the surfactants is crosslinked with a crosslinking reagent.

4. A method according to claim 3 wherein the crosslinking reagent is selected from the group consisting of aldehydes, epoxides, acyl halides, alkyl halides, isocyanates, amines, anhydrides, acids, alcohols, haloacetals, aryl carbonates, thiols, esters, imides, vinyls, azides, nitros, peroxides, sulfones, maleimides, vinyl sulfone, succinyl chloride, polyanhydrides, poly-B-malic acid, ethylene glycolbis->succinimidyl succinate, succinimidyl succinate-polyethylene glycol, and succinimidyl succinamide-polyethylene glycol.

5. A method according to claim 1 wherein the one or more separators include one or more separator materials selected from the group consisting of nonwoven polymers, microporous polymers, track etched materials and papers.

6. A method according to claim 5 wherein the one or more separators include one or more separator materials selected from the group consisting of polyesters, polyethylene, polypropylene, polycarbonate, polytetrafluoroethylene, Kraft paper and Manila paper.

7. A method according to claim 1 wherein the one or more surfactants are selected from the group consisting of polyvinyl alcohol, dextran, agarose, alginate, polyacrylamide, polyglycidol, polyvinyl alcohol-co-polyethylene, poly(vinyl acetate-co-vinyl alcohol), polyacrylic acid, polyamide, polypeptides, poly-lysine, polyethyleneimine, poly-.beta.-malic acid, hyaluronic acid, derivatives of hyaluronic acid, polysaccharides, polyvinylpyrrolidone, and combinations or copolymers thereof.

8. A method according to claim 1 wherein the one or more surfactants are mixed with the electrolyte.

9. A method according to claim 1 further comprising arranging the capacitor cell in a substantially flat, coiled configuration.

10. A method according to claim 1 further comprising arranging the capacitor cell in a cylindrical coiled configuration.

11. A method according to claim 1 further comprising arranging the capacitor cell in a stacked configuration.

* * * * *